(12) United States Patent
Shibata

(10) Patent No.: US 8,842,329 B2
(45) Date of Patent: Sep. 23, 2014

(54) IMAGE FORMING APPARATUS EQUIPPED WITH REAL-SIZE PREVIEW FUNCTION, IMAGE DISPLAY METHOD, AND STORAGE MEDIUM

(71) Applicant: Canon Kabushiki Kaisha, Tokyo (JP)

(72) Inventor: Daisuke Shibata, Kawasaki (JP)

(73) Assignee: Canon Kabushiki Kaisha (JP)

(*) Notice: Subject to any disclaimer, the term of this patent is extended or adjusted under 35 U.S.C. 154(b) by 7 days.

(21) Appl. No.: 13/706,941

(22) Filed: Dec. 6, 2012

(65) Prior Publication Data

US 2013/0141738 A1 Jun. 6, 2013

(30) Foreign Application Priority Data

Dec. 6, 2011 (JP) .................................. 2011-266843

(51) Int. Cl.
*G06F 15/00* (2006.01)

(52) U.S. Cl.
USPC .......................................................... 358/1.2

(58) Field of Classification Search
CPC .............................. G06F 3/1256; G06F 3/1257
USPC .......................................................... 358/1.2
See application file for complete search history.

(56) References Cited

U.S. PATENT DOCUMENTS

2010/0165386 A1* 7/2010 Kusunoki ..................... 358/1.15

FOREIGN PATENT DOCUMENTS

JP 2001-166763 A 6/2001

* cited by examiner

*Primary Examiner* — Saeid Ebrahimi Dehkordy
(74) *Attorney, Agent, or Firm* — Rossi, Kimms & McDowell LLP

(57) ABSTRACT

An image forming apparatus which is capable of executing real-size preview of image data which does not have output sheet size information or resolution information. The image forming apparatus stores a plurality of data items therein. A printer section prints a data item selected from the stored data items. A controller unit determines whether or not the selected data item has sheet size information. When it is determined that the selected data item does not have sheet size information, the controller unit prompts the user to select a sheet size for printing of the selected data item via a console section. An image for real-size preview is generated from the selected data item based on a sheet size selected via the console section, and displayed on the console section.

8 Claims, 11 Drawing Sheets

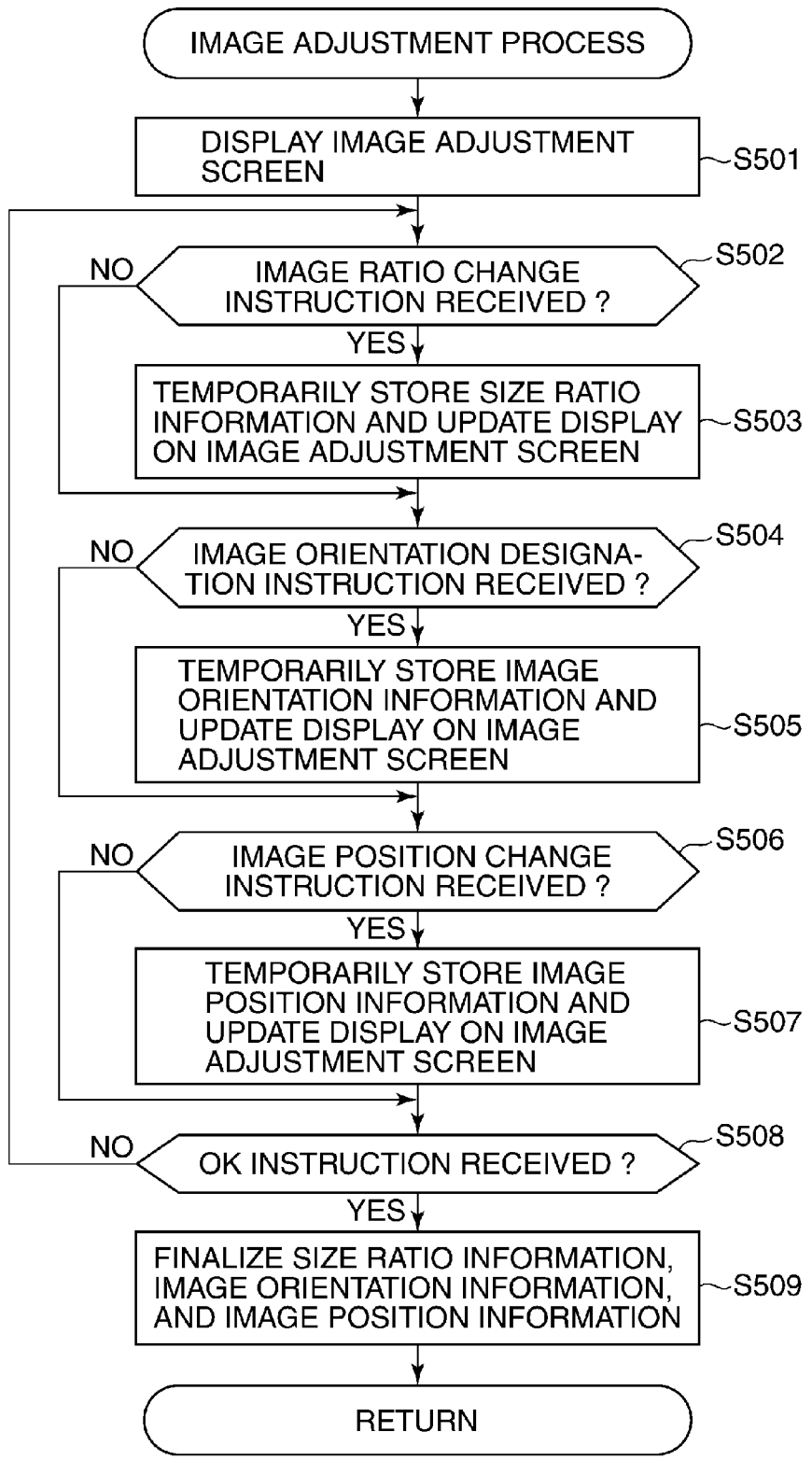

IMAGE FORMING APPARATUS EQUIPPED WITH REAL-SIZE PREVIEW FUNCTION, IMAGE DISPLAY METHOD, AND STORAGE MEDIUM

BACKGROUND OF THE INVENTION

1. Field of the Invention

The present invention relates to an image forming apparatus, an image display method, and a storage medium, and more particularly to a preview function of an image forming apparatus.

2. Description of the Related Art

In recent years, with improvement of the capability of a display device, such as an operation panel, an image forming apparatus has come to be equipped with a function of previewing data accumulated in a hard disk (BOX) of the image forming apparatus or image data obtained by scanning a sheet original. As one of such preview functions, a technique has been proposed in which characters or graphics included in an image to be printed are displayed in the same sizes as those of the image to be formed on a sheet, so as to enable a user to check the image size before printing (see e.g. Japanese Patent Laid-Open Publication No. 2001-166763). In the following description, this preview function will be referred to as "real-size preview". Since the real-size preview function enables a user to check the size of characters or graphics included in an image before printing of the image, it is possible to prevent occurrence of a printing error that characters or graphics are printed in unintended sizes.

The image forming apparatus is configured to be capable of accumulating data in various formats, such as document data and image data, in the BOX of the image forming apparatus. Document data in such a format includes information, such as data sheet size information (output sheet size information) as a reference of a document size and resolution information. Image data includes information, such as the number of pixels of an image, resolution, and data sheet size information, etc.

However, data in some format does not have information with reference to which a print size is determined, such as data sheet size information and resolution information. Such data includes image data, such as JPEG. Since such image data does not have data sheet size information or resolution information, it is impossible to determine a print size. For this reason, the image data cannot be displayed for real-size preview.

Further, in printing image data, a reference print size is determined by causing a user to select an output sheet size desired for printing. However, it is impossible to known whether or not an image to be printed has an intended size, before the image is printed.

SUMMARY OF THE INVENTION

The present invention provides an image forming apparatus which is capable of executing real-size preview of image data which does not have output sheet size information or resolution information, an image display method, and a storage medium.

In a first aspect of the present invention, there is provided an image forming apparatus comprising a storage unit configured to store a plurality of data items, a printing unit configured to print a data item selected from the data items stored in the storage unit, a sheet size information determination unit configured to determine whether or not the selected data item has sheet size information, a selection unit configured to, when the sheet size information determination unit determines that the selected data item does not have sheet size information, cause a sheet size to be selected for printing of the selected data item, a generation unit configured to generate an image for real-size preview from the selected data item based on the sheet size selected via the selection unit, and a display unit configured to display the image for real-size preview generated by the generation unit.

In a second aspect of the present invention, there is provided an image display method for an image forming apparatus including a storage unit configured to store a plurality of data items and a printing unit configured to print a data item selected from the data items stored in the storage unit, comprising determining whether or not the selected data item has sheet size information, causing, when it is determined by the determining that the selected data item does not have sheet size information, a sheet size to be selected for printing of the selected data item, generating an image for real-size preview from the selected data item based on the selected sheet size, and displaying the generated image for real-size preview.

In a third aspect of the present invention, there is provided a non-transitory computer-readable storage medium storing a computer-readable program for causing a computer to execute an image display method for an image forming apparatus including a storage unit configured to store a plurality of data items, a printing unit configured to print a data item selected from the data items stored in the storage unit, and the computer, wherein the image display method comprises determining whether or not the selected data item has sheet size information, causing, when it is determined by the determining that the selected data item does not have sheet size information, a sheet size to be selected for printing of the selected data item, generating an image for real-size preview from the selected data item based on the selected sheet size, and displaying the image for real-size preview generated by the generation unit.

According to the present invention, it is possible to execute real-size preview of image data which does not have output sheet size information or resolution information.

Further features of the present invention will become apparent from the following description of exemplary embodiments with reference to the attached drawings.

BRIEF DESCRIPTION OF THE DRAWINGS

FIG. 6 is a flowchart of an image adjustment process executed in a step in FIG. 5.

DESCRIPTION OF THE EMBODIMENTS

The present invention will now be described in detail below with reference to the accompanying drawings showing an embodiment thereof.

Figure 1:
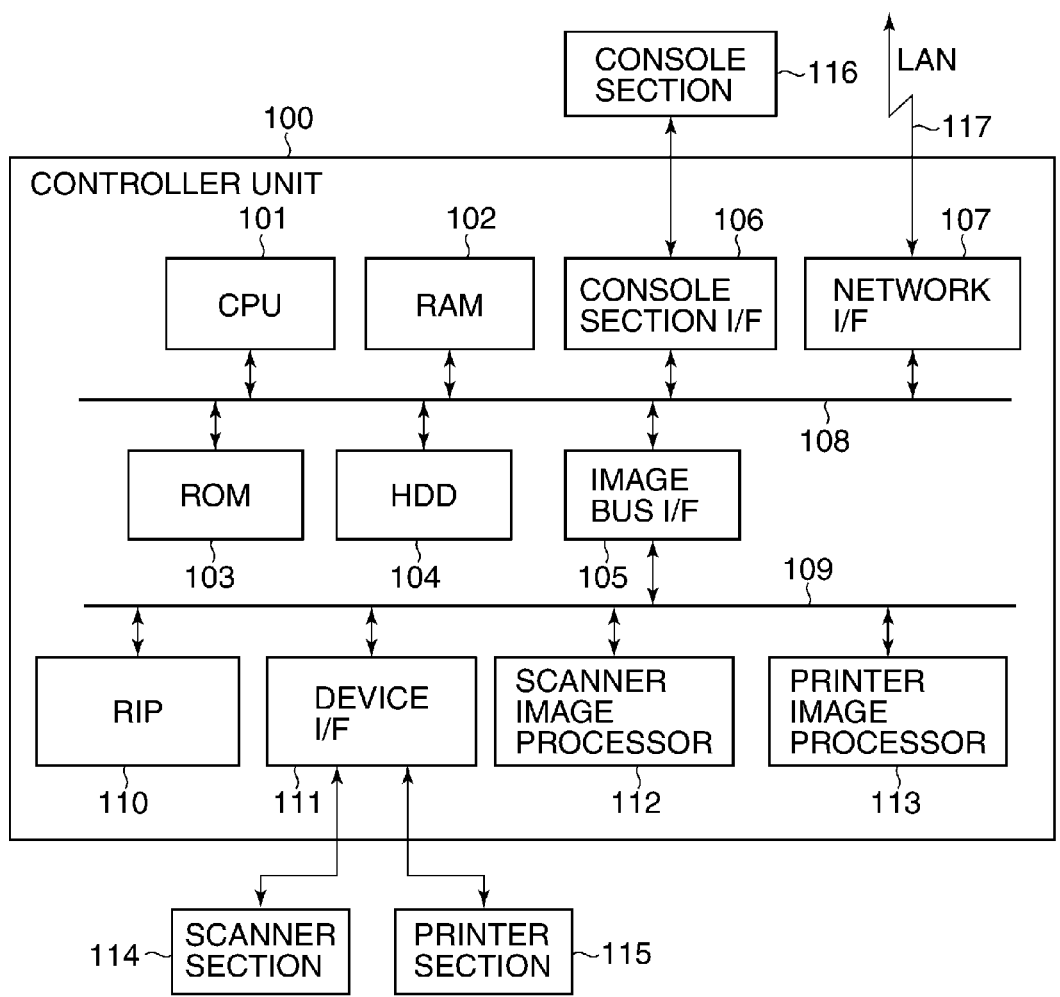
FIG. 1 is a diagram of the hardware configuration of an image forming apparatus according to an embodiment of the present invention.

FIG. 1 is a diagram of the hardware configuration of an image forming apparatus according to the embodiment of the present invention.

The image forming apparatus according to the present embodiment is a multifunctional peripheral which is capable of performing image processing, such as input and output, storage, and transmission of image data. The image forming apparatus comprises a controller unit 100 that controls the overall operation of the apparatus, a scanner section 114 as an image input device, a printer section 115 as an image output device, and a console section 116 that receives an instruction from a user and provides information to the user. The scanner section 114, the printer section 115, and the console section 116 are connected to the controller unit 100, and are controlled by commands from the controller unit 100.

The controller unit 100 has a CPU 101. The CPU 101 is connected to a RAM 102, a ROM 103, a HDD 104, an image bus interface 105, a console section interface 106, and a network interface 107 via a system bus 108. The RAM 102 is a memory that provides a work area for the CPU 101, and functions as a setting storage memory for temporarily storing parameter settings. Further, the RAM 102 is used as an image memory for temporarily storing image data. The ROM 103 is a boot ROM. The ROM 103 stores a system boot program. The HDD 104 is a large-capacity storage memory. The HDD 104 stores system software, a parameter setting history, image data, and so forth. In particular, the HDD 104 has a data storage area called "BOX". The BOX is divided into a plurality of areas assigned respective BOX numbers (e.g. 1 to 99) in advance, and image data read by the scanner section 114, data received from an external PC, and so forth can be stored in a storage area assigned a designated BOX number. The BOX can store data of any format, such as JPEG, TIFF, PDF, or BITMAP. Further, document files generated e.g. by using Microsoft Word or Excel can be stored in the BOX. Data stored in the BOX can be printed afterward by the printer section 115 or can be transmitted to an external apparatus via the network interface 107.

The CPU 101 loads the system boot program stored in the ROM 103 into the RAM 102. When loading of the system boot program is completed, the CPU 101 becomes capable of executing a controller program.

The console section interface 106 provides interface for transmission and reception of information to and from the console section 116. The console section interface 106 outputs image data to be displayed on the console section 116 to the same and transfers information input by a user via the console section 116 to the CPU 101. The network interface 107 is connected to a LAN 117 to transmit and receive information to and from the LAN 117. The image bus interface 105 is a bus bridge that connects between the system bus 108 and an image bus 109 and performs data structure conversion.

Connected to the image bus 109 are a RIP (raster image processor) 110, a device interface 111, a scanner image processor 112, and a printer image processor 113. The RIP 110 rasterizes a PDL (page description language) code received from an external apparatus via the LAN 117 into a bitmap image. The device interface 111 connects between the controller unit 100, and the scanner section 114 and the printer section 115 to perform synchronous-to-asynchronous or asynchronous-to-synchronous conversion of image data. Further, the device interface 111 transfers settings, adjustment values, and data on the status of the apparatus to the scanner section 114 and the printer section 115. The scanner image processor 112 corrects, processes, and edits input image data. The printer image processor 113 performs printer image correction of image data to be printed out.

The console section 116 receives a real-size preview display instruction from the user and sends the display instruction to the controller unit 100.

Upon receipt of the display instruction from the console section 116, the controller unit 100 loads image data read by the scanner section 114, image data received from an external apparatus via the network interface 107, or image data stored in the HDD 104, into the RAM 102. The CPU 101 generates an image for real-size preview of the image data stored in the RAM 102. As described hereinbefore, an image for real-size preview is generated such that characters or graphics included in an image to be printed are displayed in the same sizes as those of the image to be formed on a sheet.

An image for real-size preview is generated by the following method: The CPU 101 acquires a display resolution x of the console section 116. Then, the CPU 101 acquires a print resolution y of the printer section 115. The CPU 101 reduces (enlarges) an image to be printed, at a ratio obtained by x/y, to thereby generate an image for real-size preview. For example, assuming that the display resolution x is 72 [dpi] and the print resolution y is 600 [dpi], the CPU 101 reduces an image to be printed, at a ratio of x/y=72/600=0.12 (12%), to thereby generate an image for real-size preview. When the output sheet size information indicates A4-size image data, the data has an image size of a horizontal length of 210 mm×a vertical length of 297 mm. The number of pixels of this image data can be calculated by the following equations:

the number of horizontal pixels of $A4$=210 mm (horizontal length of $A4$)/(25.4 mm/inch)×600 [dpi] =4960 pixels, and the number of vertical pixels of $A4$=297 mm (vertical length of $A4$)/(25.4 mm/inch)×600 [dpi]=7015 pixels.

The image is reduced at the ratio of 12%, and therefore the number of pixels of the associated image for real-size preview is expressed by the following equations:

the number of horizontal pixels of the image for real-size preview=4960 pixels×0.12=596 pixels, and the number of vertical pixels of the image for real-size preview=7015 pixels×0.12=842 pixels.

Note that image processing for generation of an image for real-size preview may be performed by the CPU 101, or alternatively by the scanner image processor 112 or the printer image processor 113.

The generated image for real-size preview is sent from the RAM 102 to the console section 116 via the console section interface 106. When the user selects an area to be displayed, the image for real-size preview is displayed.

Next, an image display method for displaying an image for real-size preview will be described with reference to FIGS. 2A to 2C, 3A to 3C, and 4A and 4B.

Figure 2A:
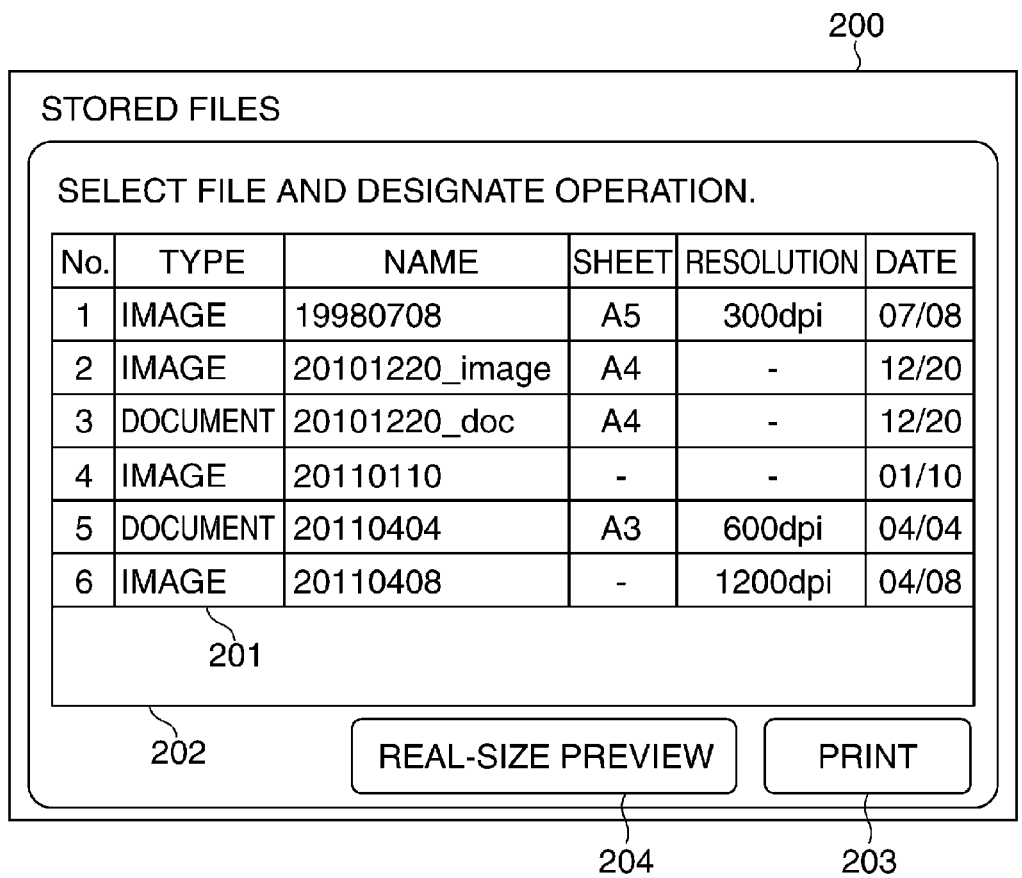
FIGS. 2A to 2C are views each illustrating an example of a screen displayed on a console section.

When a request for using data in the BOX is received from the user, the console section 116 displays a screen 200 illustrated in FIG. 2A. The screen 200 displays a list of data items currently stored in the BOX. Although in the present embodiment, the BOX is provided in the HDD 104, it may be provided in an external storage device connected to the image forming apparatus, or in an external information apparatus connectable via the network interface 107.

The BOX stores, in association with each data item, information items, such as a data format, a data name, a data update date, a data sheet size, and a resolution, for management. The data format indicates the format of document data or image data. The user can assign a data name, as desired, to a data item. The data update date indicates a date of last update of contents of data, such as when data was created or when it was edited. The data sheet size indicates a sheet size designated for layout of a data item. For example, when the data item is document data, the data sheet size indicates a sheet size to be used for layout of the associated document, and similarly, when the data item is image data as well, the data sheet size indicates a sheet size to be used for layout of the associated image. In this case, the sheet size is e.g. A4, A3, B4, B5, or Letter. The information item of the resolution indicate a resolution at which an image is formed (printed, in this example). The resolution is expressed by [dpi=pixels/inch]. When the data item is image data, the resolution can be determined from the number of pixels of the data item and the data sheet size, and assuming that the number of pixels of data is given, if there is information on one of the resolution and the data sheet size, the other can be definitely determined. Data items 201 of data stored in the BOX are generated based on the above-described information items, and are displayed in a list form on a data list 202.

The data list 202 may be displayed as a list of thumbnails of data items stored in the BOX, in place of the list form used in the screen 200 in the present example. The user can select one or more desired data items 201 from the data list 202. When the user selects a data item 201, a print button 203 and a real-size preview button 204 on the screen 200 are each enabled to receive an instruction (depression). When the console section 116 receives an instruction from the print button 203, the screen 200 shifts to a print setting screen for printing of the data item 201 selected by the user. Detailed description of the print setting screen is omitted.

When the console section 116 receives an instruction from the real-size preview button 204, a screen to be switchingly displayed is determined based on information possessed by the data item 201 selected by the user. When the format of the selected data is for a document, the screen 200 shifts to a screen 210 illustrated in FIG. 2B. When the format of the selected data is for an image, the screen 200 shifts to a screen 220 illustrated in FIG. 2C. For example, when an item No. 3 or No. 5 has been selected from the data displayed in the data list 202, the format of the data item is for a document, and therefore the screen 200 shifts to the screen 210. When one of the items No. 1, No. 2, No. 4, and No. 6 has been selected, the format of the data item is for an image, and therefore the screen 200 shifts to the screen 220.

Figure 2B:
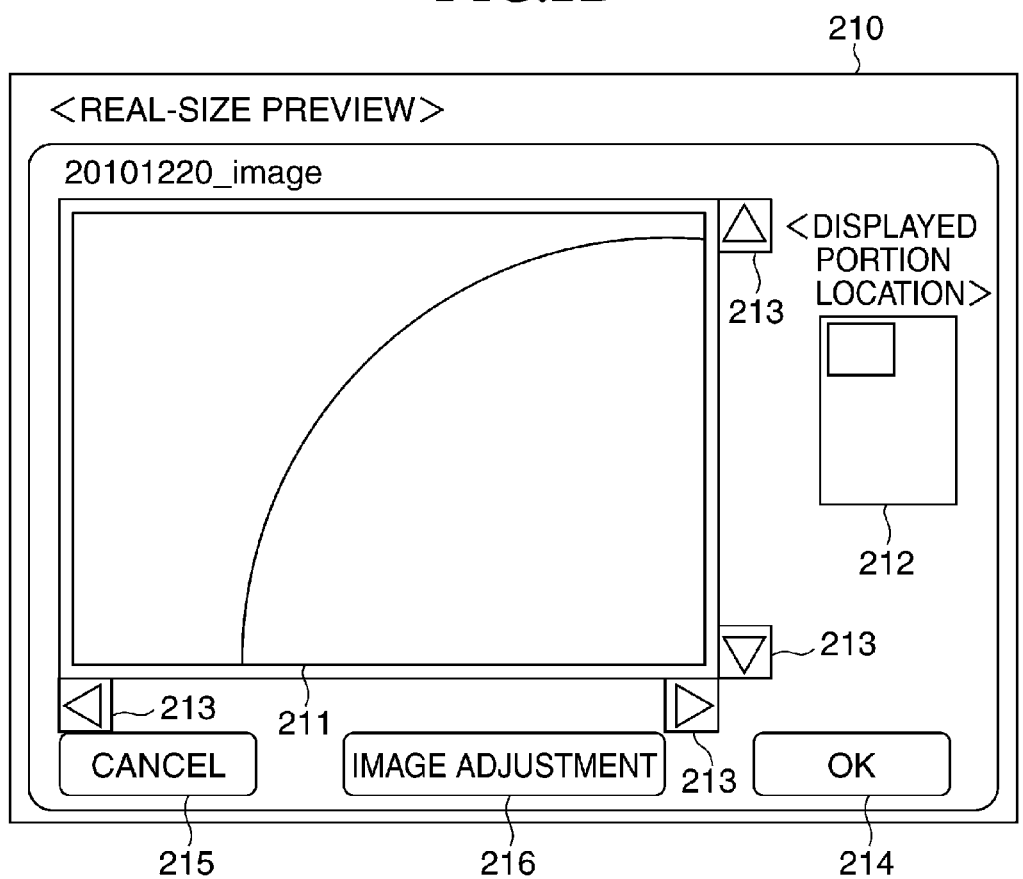

The screen 210 in FIG. 2B is a screen for displaying an image for real-size preview.

Referring to FIG. 2B, a real-size preview display area 211 displays an image for real-size preview generated from data selected by the user. A displayed portion location view area 212 displays an image indicating where a portion displayed in the real-size preview display area 211 is located in the entire image for real-size preview.

Displayed portion change buttons 213 are used to give an instruction for changing a location of a portion, displayed in the real-size preview display area 211, of the image for real-size preview. The displayed portion change buttons 213 include four-direction buttons, i.e. up, down, left, and right buttons. For example, when the down button is pressed, the location of the portion of the image for real-size preview displayed in the real-size preview display area 211 is changed to a lower portion of the entire image for real-size preview. In the console section 116, contents displayed in the real-size preview display area 211 are updated such that a portion of the image for real-size preview changed in location are displayed. Further, contents displayed in the displayed portion location view area 212 are also updated according to the contents displayed in the real-size preview display area 211. When an image portion displayed in the real-size preview display area 211 is an end portion of the image for real-size preview, an instruction from a displayed portion change button 213 corresponding to a direction toward the end of the image for real-size preview is ignored.

An OK button 214 is used to terminate the display of a real-size preview. When an instruction from the OK button 214 is received, the screen 210 shifts to the screen 200 illustrated in FIG. 2A. At this time, temporarily stored information, such as output sheet size information, is stored together with the selected data.

A cancel button 215 is also used to terminate the display of a real-size preview. When an instruction from the cancel button 215 is received, the screen 210 shifts to the screen 200 illustrated in FIG. 2A. At this time, temporarily stored information is abandoned without being stored.

An image adjustment button 216 is used to give an instruction for shifting to an image adjustment screen. When an instruction from the image adjustment button 216 is received, the screen 210 shifts to a screen 230 illustrated in FIG. 3A.

Figure 2C:
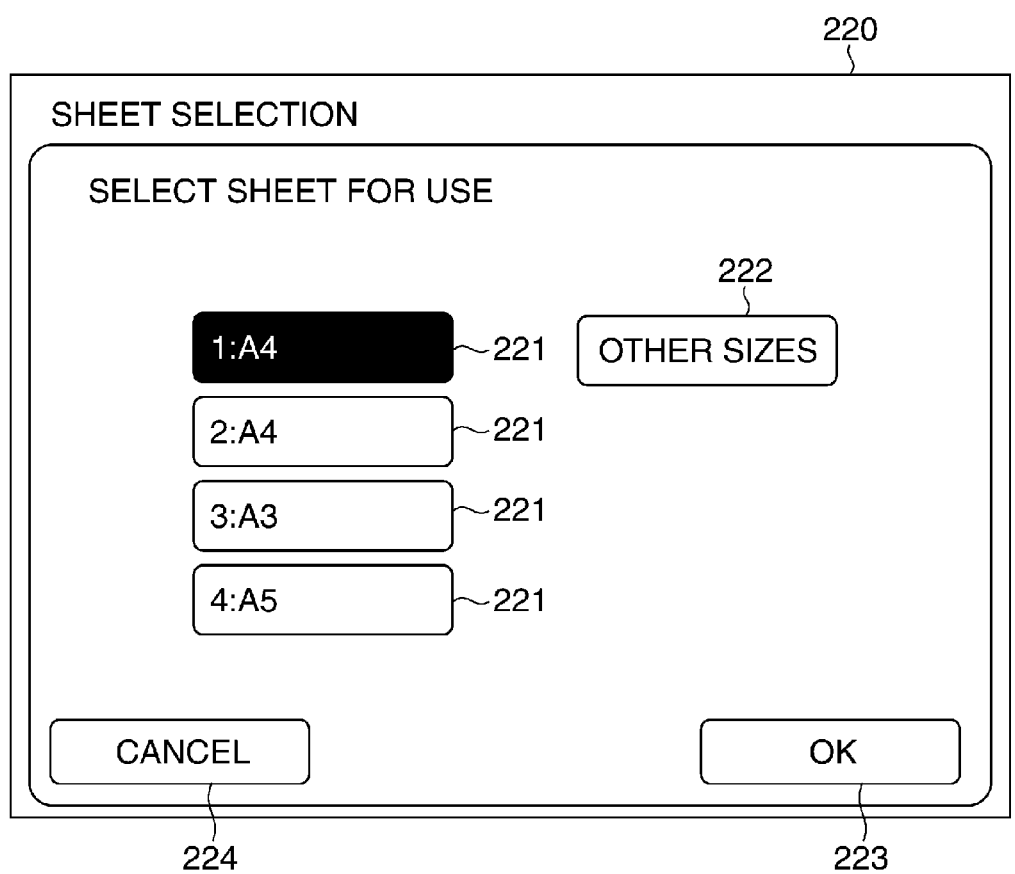

The screen 220 illustrated in FIG. 2C is a screen for prompting the user to select an output sheet size for printing of the selected data. Similarly to the data sheet size, information on the output sheet size is indicated as e.g. A4, A3, B4, B5, or Letter. Each of the sheet sizes has a vertical length and a horizontal length.

Referring to FIG. 2C, cassette setting buttons 221 are associated with respective sheet feed cassettes in the printer section 115. The cassette setting buttons 221 displayed on the screen 220 correspond in number to the sheet feed cassettes of the printer section 115. The number of the sheet feed cassettes varies with the configuration of the apparatus. In the present example, it is assumed that the printer section 115 is provided with four sheet feed cassettes, and therefore there are displayed four cassette setting buttons 221. Each of the sheet feed cassettes has a sheet size set according to the type of sheets contained therein, and the sheet size is displayed in a cassette setting button 221 associated with the sheet feed cassette. When an instruction from the cassette setting button 221 is received, the cassette setting button 221 becomes selectable.

An other sizes button 222 is used to designate a sheet size other than the sizes set for the respective sheet feed cassettes. When an instruction from the "other sizes" button 222 is received, the screen 220 shifts to a screen for displaying a list of sheet sizes supported by the image forming apparatus, and receives selection of a desired sheet size from the sheet size list. In this case, it is also possible to enable the user to input a desired sheet size other than the sizes displayed in the sheet size list. The other sizes button 222 is displayed in a selected state only after receiving the selection of a desired sheet size. Only one of the cassette setting buttons 221 and the "other sizes" button 222 is displayed in a selected state.

After selecting one of the cassette setting buttons 221, when another one of the cassette setting buttons 221 is selected, the display of the precedingly selected one of the cassette setting buttons 221 in the selected state is canceled, and the display of the newly selected one of the cassette setting buttons 221 in the selected state becomes active.

An OK button 223 is used to terminate selection of an output sheet size for printing of selected data. The OK button 223 is enabled when one of the cassette setting buttons 221 or the "other sizes" button 222 is displayed in the selected state. In a state where neither of a cassette setting button 221 and the "other sizes" button 222 has been selected, the OK button 223 is disabled. When the OK button 223 is pressed, a sheet size setting associated with the selected button is temporarily stored as output sheet size information on the selected data. Then, whether or not the selected data has resolution information is determined, whereby a screen to be displayed next is determined. When the selected data has resolution information, the screen 220 shifts to the screen 210 in FIG. 2B, whereas when the selected data does not have resolution information, the screen 220 shifts to the screen 230 in FIG. 3A. In the present example, each of the image data items No. 1 and No. 6 of the data items displayed in the data list 202 has resolution information. Further, since the image data item No. 2 has data sheet size information, a resolution thereof is definitely determined. Therefore, when any of the image data items No. 1, No. 2, and No. 6 has been selected, the screen 220 shifts to the screen 210. The image data item No. 4 does not have either resolution information or data sheet size information, and therefore, in a case where the image data item No. 4 has been selected, the screen 220 shifts to the screen 230.

A cancel button 224 is used to terminate selection of an output sheet size for printing of selected data. When an instruction from the cancel button 224 is received, the screen 220 shifts to the screen 200 in FIG. 2A, without the output sheet size information being temporarily stored.

Figure 3A:
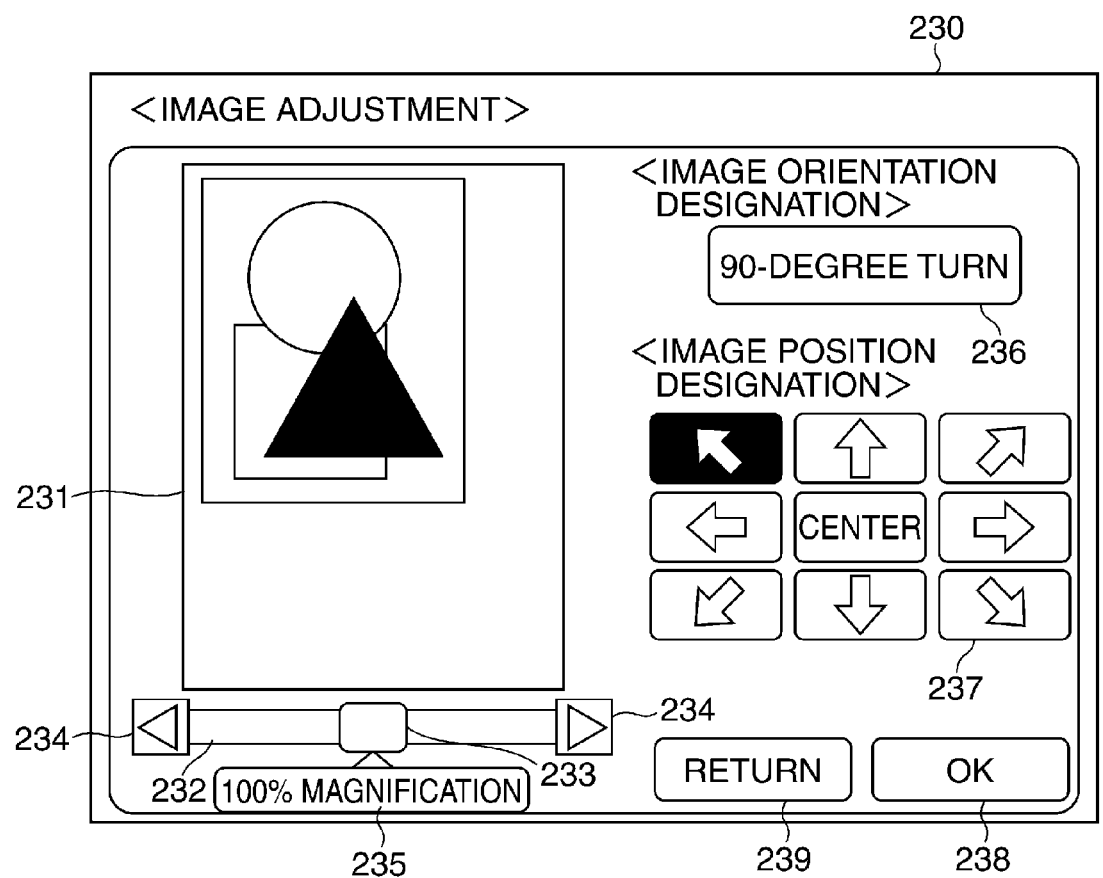
FIGS. 3A to 3C are views each illustrating another example of the screen displayed on the console section.

The screen 230 in FIG. 3A is an image adjustment screen.

Referring to FIG. 3A, an image ratio display area 231 is an area for displaying a ratio indicating image which represents a ratio between the size of a sheet for printing and that of an image to be printed on the sheet. The ratio indicating image comprises a sheet section representative of a sheet size and an image section representative of an image size, and is formed such that a ratio between the sheet section and the image section can be seen. The ratio indicating image is generated based on output sheet size information, size ratio information, image orientation information, and image position information. The image section of the ratio indicating image is only required to show a difference in size from the sheet section, a position on the sheet section, and a change in orientation. Therefore, the image section may be formed by e.g. a rectangular figure or by the thumbnail of selected data. A method of generating a ratio indicating image will be described in detail hereinafter.

Size ratio information is ratio information indicative of the relationship between a selected output sheet size and the size of an image to be printed on a sheet of the size. The size ratio information can be obtained from output sheet size information and the number of pixels and resolution of data. Further, by designating size ratio information, it is possible to designate the size of an image to be printed. Each of output sheet size information and the size of an image to be printed on a sheet has vertical and horizontal lengths. In the present example, size ratio information does not have independent values set in the respective vertical and horizontal directions, but only one of vertical size ratio information and horizontal size ratio information is used, assuming that the two assume the same value. If it is desired to change the vertical size ratio and the horizontal size ratio individually, the vertical and horizontal values of the size ratio information may be set differently and stored. A method of determining which of the vertical size ratio information and the horizontal size ratio information is to be used will be described in detail hereinafter.

Figure 3B:
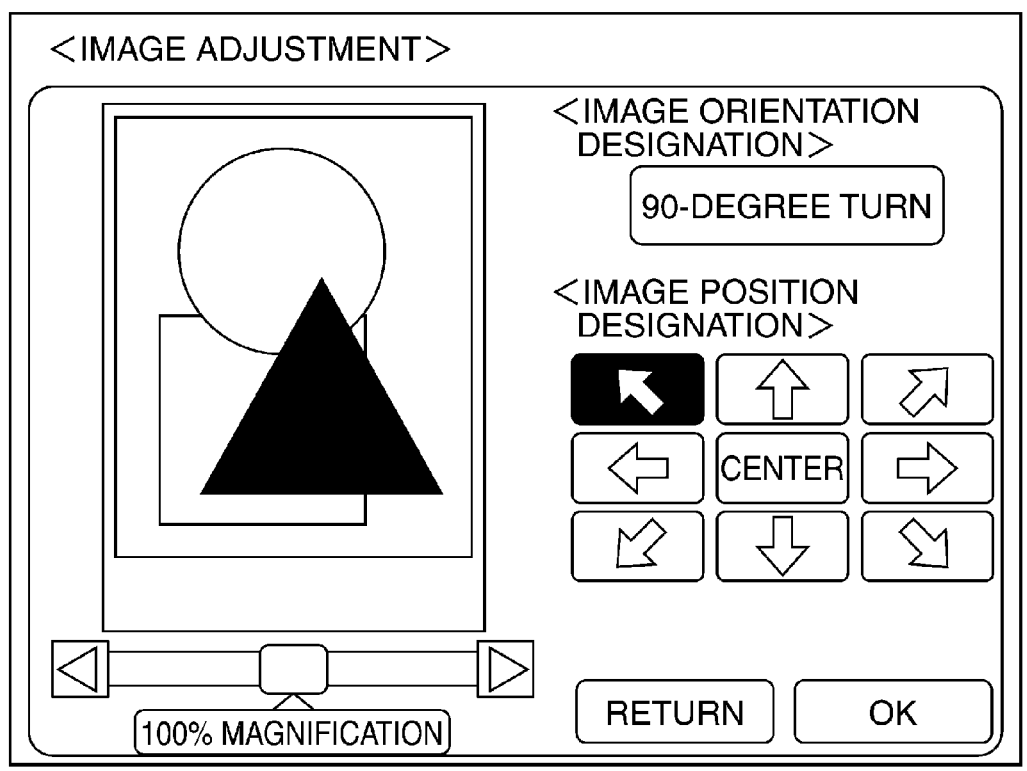

An image ratio change slider 232 is used to set the size ratio information. When a knob 233 is moved leftward along the image ratio change slider 232 or a left ratio change button 234 is operated, the size ratio information is changed such that the size of the image to be printed on the sheet is reduced, and the changed size ratio information is temporarily stored. On the other hand, when the knob 233 is moved rightward or a right ratio change button 234 is operated, the size ratio information is changed such that the size of the image to be printed on the sheet is enlarged, and the changed size ratio information is temporarily stored. FIG. 3B shows a screen displayed when an instruction is issued via the console section 116 to enlarge the size of the image to be printed on the sheet. The right end of the image ratio change slider 232 corresponds to the maximum value of the size ratio information, and the left end of the image ratio change slider 232 corresponds to the minimum value of the size ratio information. The maximum and minimum values of the size ratio information can be set to respective desired values in advance. The image ratio change slider 232 may be configured to be provided with marks respectively indicative of a plurality of size levels such that the knob 233 can be switchingly moved from one level to another, or to allow the knob 233 to freely slide along the slider. In the present example, it is assumed that the size ratio information is maximized in value when the length of the image section and that of the sheet section match in either the vertical direction or the horizontal direction. Further, in the present example, it is assumed that the image ratio change slider 232 is configured to have seven size levels in total, i.e. five levels designated by numerical values corresponding to respective items of the size ratio information, a level corresponding to 100% magnification, and a level corresponding to the printing resolution of the printer section 115. The numerical values corresponding to the respective items of the size ratio information, which designate the five levels, are 1.0, 0.8, 0.6, 0.4, and 0.2.

Figure 3C:
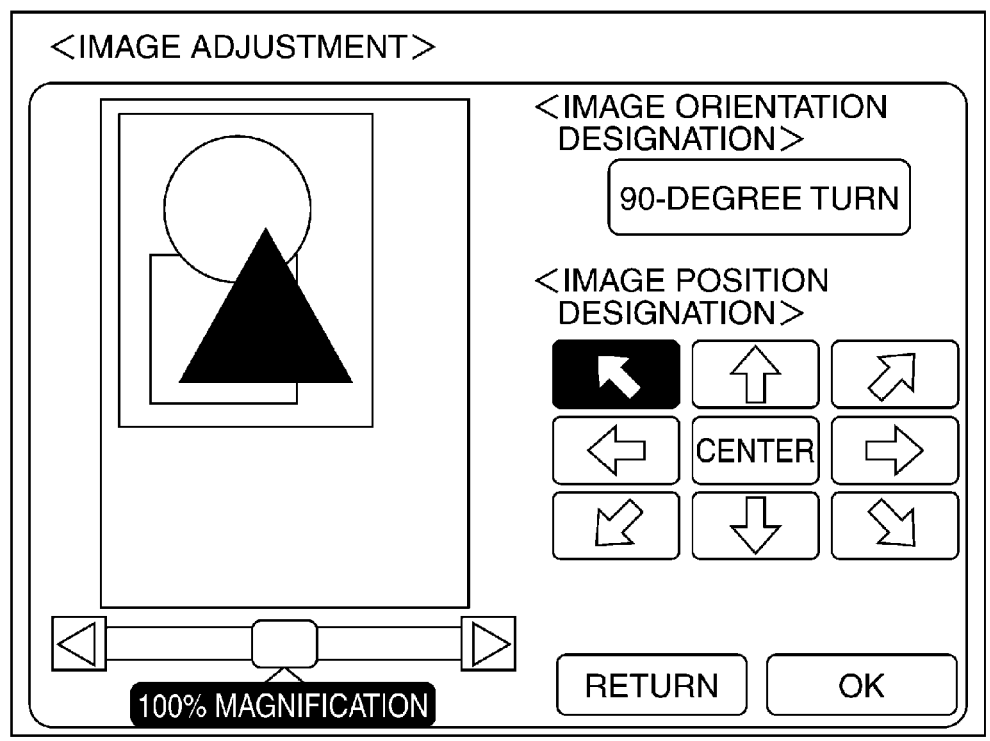

A 100% magnification button 235 is used to set the size ratio information to 100% magnification. The 100% magnification button 235 is displayed only when selected image data has resolution information. When an instruction from the 100% magnification button 235 is received, the size ratio information is determined based on the currently set output sheet size information, number of pixels, and resolution. FIG. 3C shows a screen displayed when the instruction from the 100% magnification button 235 has been received. In a case where the selected image data has resolution information, at a time point of transition to the screen 230, the 100% magnification button 235 is in a selected state. In a case where the selected image data does not have resolution information, size ratio information corresponding to the printing resolution of the printer section 115 is set. A method of calculating size ratio information corresponding to 100% magnification and a method of calculating the size ratio information corresponding to the printing resolution of the printer section 115 will be described in detail hereinafter.

Figure 4A:
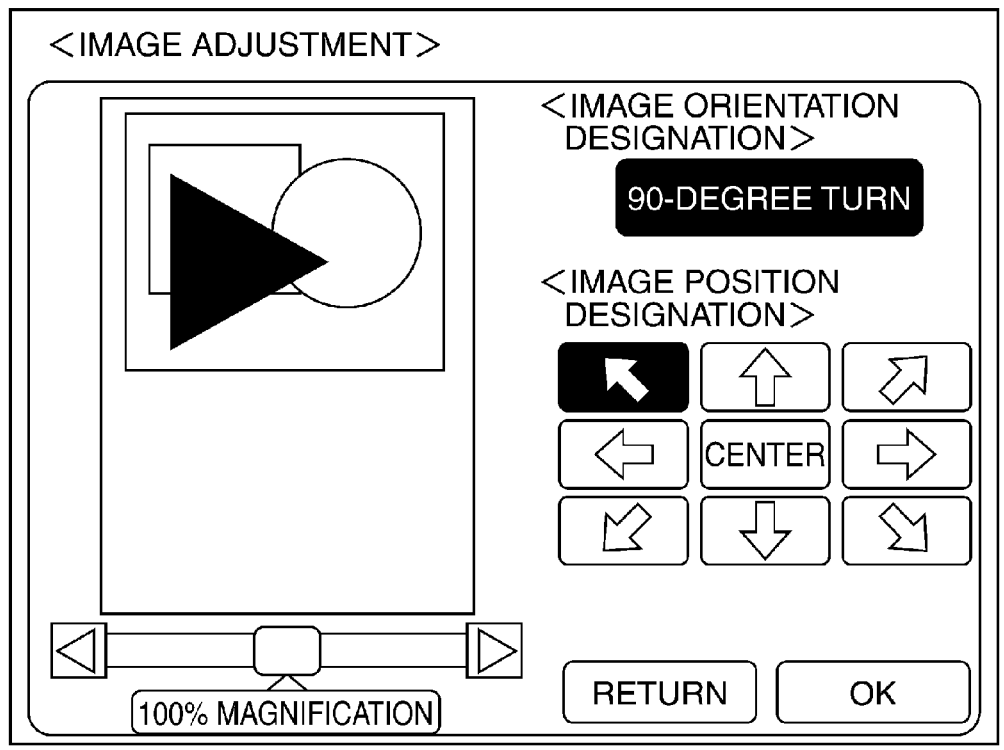
FIGS. 4A and 4B are views each illustrating still another example of the screen displayed on the console section.

An image orientation designation button 236 is used to designate the orientation of an image on a sheet. By pressing the image orientation designation button 236, it is possible to issue an instruction for turning the orientation of an image through 90 degrees. The image orientation designation button 236 may be configured to be operable when pressed once, to turn the orientation of the image through 90 degrees and when pressed again, to return the image to its original orientation, or alternatively when pressed again, to further turn the orientation of the image through 90 degrees. Further, the image orientation designation button 236 may be formed of four buttons, i.e. up, down, left, and right buttons at intervals of angles of 90 degrees in association with respective directions from the current orientation of the image. FIG. 4A shows a screen displayed when an instruction from the image orientation designation button 236 has been received. At a time point of transition to the screen 230, the image orientation designation button 236 is in a non-selected state, and a value indicative of no rotation (0 degrees) is temporarily stored as image orientation information.

An image position designation button group 237 is used to designate a location on a sheet where an image is to be positioned. At a time point of transition to the screen 230, the image position designation button group 237 is in a state where an upper left button is selected, and the position of upper left is temporarily stored as image position information.

Figure 4B:
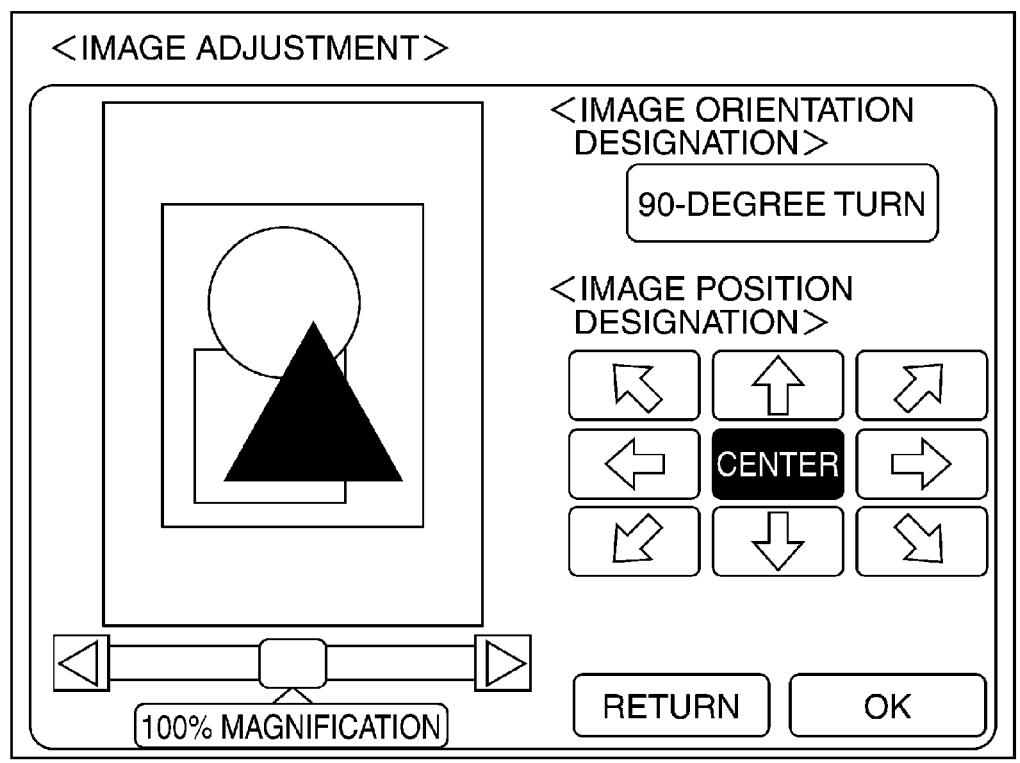

The image position designation button group 237 is formed of nine buttons including eight directional buttons, i.e. up, down, left, right, up-left and down-left, up-right, and down-right buttons, and a center button. Each of the buttons corresponds to an associated position of an image on a sheet, and when an instruction from one of the buttons is received, the position of the image is changed. More specifically, when the up button is pressed, the image position is changed to the center of the upper end, and when the down button is pressed, the image position is changed to the center of the lower end. When the left button is pressed, the image position is changed to the center of the left end, and when the right button is pressed, the image position is changed to the center of the right end. When the up-left button, the down-left button, the up-right button, or the down-right button is pressed, the image position is changed to an associated corner. When the center button is pressed, the data position is changed to the center of the sheet. FIG. 4B shows a screen displayed when the center button of the image position designation button group 237 is pressed.

A ratio indicating image is regenerated according to how the knob 233 of the image ratio change slider 232, the ratio change buttons 234, the 100% magnification button 235, the image orientation designation button 236, and the image position designation button group 237 have been operated, and the displayed image in the image ratio display area 231 is updated.

An OK button 238 is used to terminate display of the image adjustment screen. When an instruction from the OK button 238 is received, an image for real-size preview is generated from the output sheet size information, the size of the image to be printed, the size ratio information, the image position information, and the image orientation information, and the screen 230 shifts to the screen 210 in FIG. 2B.

A return button 239 is used to terminate display of the image adjustment screen and issue an instruction for transition to a screen displayed before displaying the screen 230 in FIG. 3A. When an instruction from the return button 239 is received, the state of each of the buttons selected on the image adjustment screen is temporarily stored. Then, when the screen 230 has been switchingly displayed after display of the screen 210 in FIG. 2B, the screen 230 shifts to the screen 210, whereas when the screen 230 has been switchingly displayed after display of the screen 220 in FIG. 2C, the screen 230 shifts to the screen 220.

The size of an image on a sheet is designated using size ratio information. In doing this, unless the size ratio information is set to such a value at which the image size is not larger than that of the sheet both in the vertical and horizontal directions, the image becomes larger than the sheet, which makes it impossible to print the whole image area. For this reason, it is required to determine which of the vertical size ratio information and the horizontal size ratio information is to be used.

The aspect ratio (vertical length of sheet size/horizontal length of sheet size) of the sheet size set by the output sheet size information and the aspect ratio (vertical length of image data/horizontal length of image data) of the image data are determined. Then, these ratios are compared with each other, whereby it is determined which of the vertical size ratio information and the horizontal size ratio information is to be used.

When the aspect ratio of the image is smaller than that of the sheet size, the size ratio information of the horizontal length is used, whereas when the aspect ratio of the image is larger than that of the sheet size, the size ratio information of the vertical length is used. However, when the image orientation is designated such that the orientation of the image is turned through 90 degrees or 270 degrees with respect to information stored as image orientation information, the aspect ratio of the image is calculated by interchanging the vertical and horizontal lengths thereof.

Now, a method of the determination is described by taking an example of a case where the number of pixels of image data is 1920 horizontal pixels×1080 vertical pixels and the output sheet size information is set to a horizontal length of 210 mm×a vertical length of 297 mm, which is the A size. In this case, the aspect ratio of the sheet size is 297 mm (vertical length)/210 mm (horizontal length)=1.414, and the aspect ratio of the image is 1080 pixels (the number of vertical pixels)/1920 pixels (the number of horizontal pixels)=0.563. The aspect ratio (=0.563) of the image is smaller than the aspect ratio (=1.414) of the sheet size, and therefore the horizontal length is used for the size ratio information.

Now, a description is given of a case where "90 degrees" is designated as the image orientation information by way of example. Since the vertical length and horizontal length of the image are interchanged when "90 degrees" is designated as the image orientation information, the number of pixels of the image data changes to be 1080 horizontal pixels×1920 vertical pixels and the aspect ratio of the image changes to be 1920 pixels (the number of vertical pixels)/1080 pixels (the number of horizontal pixels)=1.778. The aspect ratio (=1.778) of the image is larger than the aspect ratio (=1.414) of the sheet size, and therefore the vertical length is used for the size ratio information.

When the resolution of selected image data and that of an image to be printed on a sheet are equal to each other, the selected image data is printed at 100% magnification. When the 100% magnification button 235 is selected, the size of the image to be printed is calculated from the resolution and number of pixels of the selected image data. Then, the size ratio information is calculated from the calculated image size and the output sheet size information. In the present example, it is assumed that the number of pixels of the selected image data is 1920 pixels (the number of horizontal pixels)×1080 pixels (the number of vertical pixels), and the resolution thereof is 300 dpi. Then, the size of this image can be determined by the following equations:

horizontal length=1920 pixels (the number of horizontal pixels)/300 [dpi] (resolution)×(25.4 mm/inch)
=162.6 mm, and vertical length=1080 pixels (the number of vertical pixels)/300 [dpi] (resolution)×(25.4 mm/inch)
=91.4 mm.

Assuming that the output sheet size information of A4 has been stored, the size ratio information set when the 100% magnification button 235 is pressed is calculated. The horizontal length is used as size ratio information as described hereinabove, and therefore the size ratio information is calculated by the following equation:

size ratio information=162.6 mm (image length)/210.0 mm (sheet length)=0.774

In a case where the image is printed at the same resolution as the printing resolution of the printer section 115, the size of an image to be printed is calculated from the printing resolution of the printer section 115 and the number of pixels of the selected image data. Then, the size ratio information is calculated from the calculated image size and the output sheet size information.

Assuming that the selected image data does not have resolution information, the printing resolution of the printer section 115 is 600 [dpi], and the output sheet size information of A4 has been stored, the size of the image to be printed at the printing resolution 600 [dpi] of the printer section 115 is calculated by the following equations:

horizontal length=1920 pixels (the number of horizontal pixels)/600 [dpi] (printing resolution)×(25.4 mm/inch)=81.3 mm, and vertical length=1080 pixels (the number of vertical pixels)/600 [dpi] (printing resolution)×(25.4 mm/inch)=45.7 mm The horizontal length is used as the size ratio information as described hereinabove, and therefore the size ratio information is calculated as follows:

size ratio information=81.3 mm (image length) /210.0 mm (sheet length)=0.387

A ratio indicating image is generated from the selected data and the temporarily stored information.

The size of the sheet section of the ratio indicating image is calculated from the area size of the image ratio display area 231. The sheet section has a size that fits in the area size vertically and horizontally in accordance with the aspect ratio of the sheet size in the output sheet size information. Assuming that the area size of the image ratio display area 231 has 320 pixels×320 pixels and that a horizontal length of 210 mm×a vertical length of 297 mm, which is A4 size, is stored as the output sheet size information, the sheet section is formed such that it has a vertical length corresponding to 320 pixels, and therefore the size of the sheet section is set to 226 horizontal pixels×320 vertical pixels.

The size of the image section is calculated by applying the size ratio information to the size of the sheet section. Let it be assumed that the number of pixels of the image data is 1920 horizontal pixels×1080 vertical pixels and the size ratio information is 0.6. In this case, the size ratio information is used for the horizontal direction, and therefore the number of horizontal pixels of the image section is set to 226 pixels (=the number of horizontal pixels of the sheet section)×0.6=137 pixels. As a consequence, a reduction ratio at which the image size is reduced is equal to 137 pixels/1920 pixels=7.1%, and the number of vertical pixels of the image section is set to 1080 pixels (=the number of vertical pixels of the image data)×0.071=77 pixels. The orientation and position of the image section with respect to the sheet section are determined based on the image orientation information and the image position information.

Figure 5:
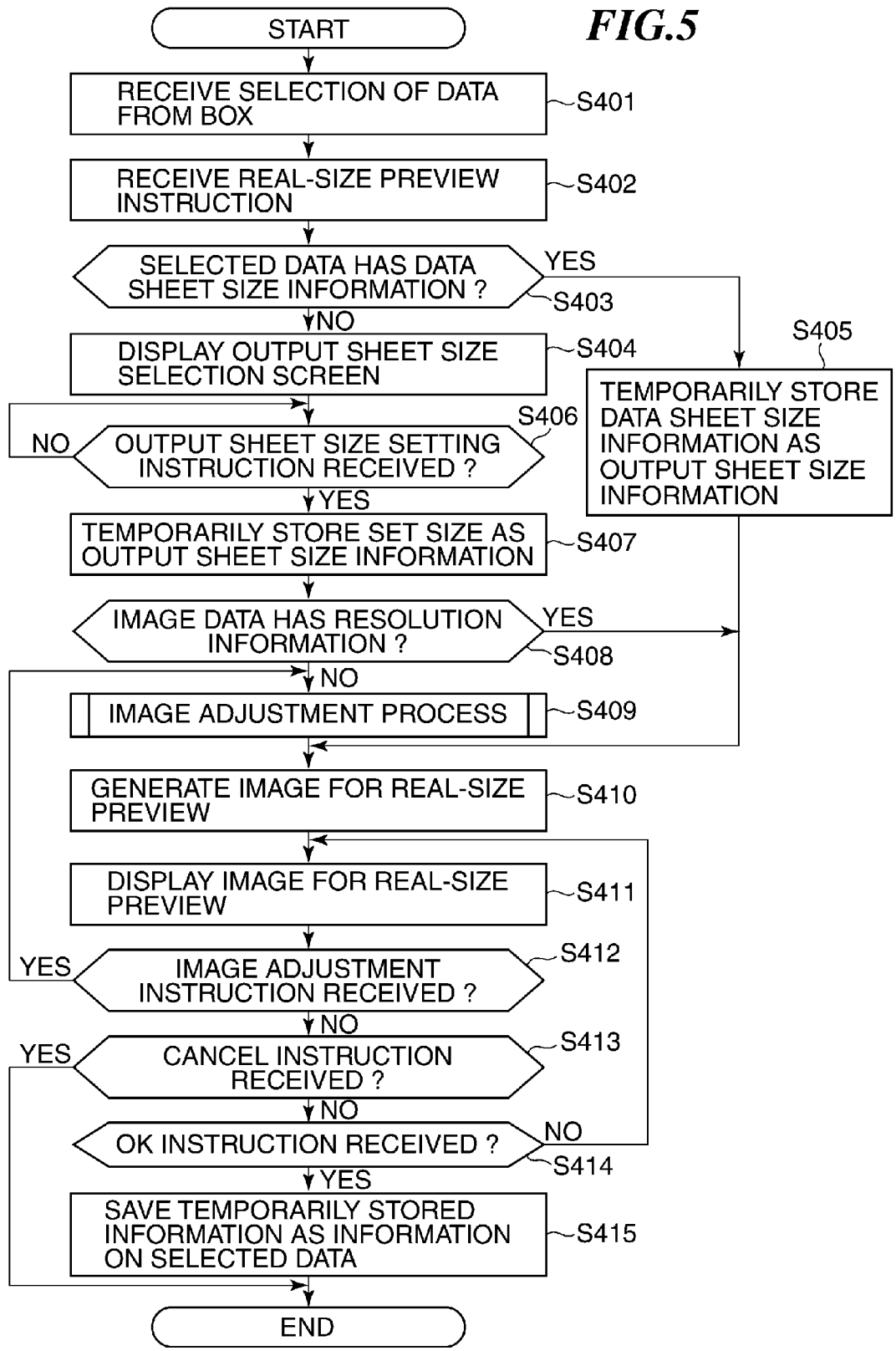
FIG. 5 is a flowchart of a real-size preview display process executed by the image forming apparatus.

FIG. 5 is a flowchart of a real-size preview display process executed by the image forming apparatus. The real-size preview display process is executed by the CPU 101 executing a program stored e.g. in the ROM of the image forming apparatus.

The present process is started when the screen 200 is displayed on the console section 116 in response to a request made by the user to use data in the storage area BOX. First, the console section 116 receives selection of a specific data item from the data list in the BOX (step S401). Further, the console section 116 receives an instruction for execution of real-size preview (step S402).

Then, the CPU 101 of the controller unit 100 determines whether or not the data item selected by the user has data sheet size information (step S403). In this step, the CPU 101 functions as a sheet size information determination unit. If it is determined that the data item has data sheet size information, the CPU 101 reads out the data sheet size information of the data item (document data) selected by the user and temporarily stores the data sheet size information as output sheet size information (step S405), and then the CPU 101 proceeds to a step S410. On the other hand, if the data item does not have data sheet size information, the CPU 101 causes the console section 116 to display the output sheet size selection screen 220 (step S404), and then proceeds to a step S406.

In the step S406, the CPU 101 determines whether or not an instruction for setting an output sheet size has been received from the output sheet size selection screen 220 displayed on the console section 116. If the instruction has not been received, the CPU 101 continues to cause the console section 116 to display the output sheet size selection screen 220. On the other hand, if the instruction has been received, the CPU 101 proceeds to a step S407.

In the step S407, the CPU 101 causes sheet size information set by the instruction received from the console section 116 to be temporarily stored as output sheet size information.

Then, the CPU 101 determines whether or not the selected image data item has resolution information (step S408). In this step, the CPU 101 functions as a resolution information determination unit. If it is determined that the selected image data has resolution information, the CPU 101 proceeds to the step S410, whereas if it is determined that the selected image data does not have resolution information, the CPU 101 proceeds to a step S409. The CPU 101 causes the console section 116 to display the image adjustment screen 230 and receives an image adjustment operation performed thereon (step S409). An image adjustment process executed in the step S409 will be described in detail hereinafter.

The CPU 101 calculates the size of an image to be printed, based on the selected data item, the temporarily stored output sheet size information, size ratio information, image position information, and image orientation information, and causes an image for real-size preview to be generated (step S410). A method of generating an image for real-size preview using the temporarily stored information will be described in detail hereinafter.

The CPU 101 causes the console section 116 to display the real-size preview screen 210 (step S411). The CPU 101 determines whether or not an image adjustment instruction has been received from the console section 116 (step S412). If it is determined that the instruction has been received, the CPU 101 returns to the step S409, whereas if it is determined that the instruction has not been received, the process proceeds to a step S413. In the step S413, the CPU 101 determines whether or not a cancel instruction has been received from the console section 116. If it is determined that the instruction has been received, the present process is terminated, whereas if it is determined that the instruction has not been received, the CPU 101 proceeds to a step S414. In the step S414, the CPU 101 determines whether or not a termination instruction has been received from the console section 116. If the instruction has not been received, the CPU 101 returns to the step S414, whereas if the instruction has been received, the process proceeds to a step S415.

In the step S415, the CPU 101 saves the temporarily stored output sheet size information, size ratio information, image position information, and image orientation information together with the selected data item, followed by terminating the present process.

Next, a detailed description will be given, with reference to FIG. 6, of the image adjustment process executed in the step S409 in FIG. 5. The present process is executed by the CPU 101 executing a program stored e.g. in the ROM of the image forming apparatus.

First, the CPU 101 causes the console section 116 to display the image adjustment screen 230 (step S501). Then, the CPU 101 whether or not a size ratio change instruction has been received from the console section 116 determines (step S502). If it is determined that the size ratio change instruction has been received, the CPU 101 proceeds to a step S503, whereas if it is determined that the instruction has not been received, the CPU 101 proceeds to a step S504.

In the step S503, the CPU 101 temporarily stores size ratio information changed by the instruction received in the step S502, causes a ratio indicating image to be generated according to the value of the size ratio information, and updates the display on the image adjustment screen 230. Assuming that the area size of the image ratio display area 231 is 320 horizontal pixels×320 vertical pixels, when the A4 size is designated as the output sheet size information, the size of the sheet section is 226 horizontal pixels×320 vertical pixels. Assuming that the number of pixels of the image data is 1920 horizontal pixels×1080 vertical pixels, and the size ratio information is 0.6, the size of the image section is 137 horizontal pixels×77 vertical pixels. At this time, if a size ratio change instruction is received and the size ratio information is changed to 0.8, the size of the image section changes is changed to 183 horizontal pixels×103 vertical pixels. The CPU 101 causes a ratio indicating image to be generated using this image section size and updates the display on the image adjustment screen 230.

In the step S504, the controller unit determines whether or not an image orientation designation instruction has been received from the console section 116. If it is determined that the image orientation designation instruction has been received, the CPU 101 proceeds to a step S505, whereas if it is determined that the instruction has not been received, the CPU 101 proceeds to a step S506.

In the step S505, the CPU 101 temporarily stores image orientation information designated in the step S504, causes a ratio indicating image to be generated according to the value of the image orientation information, and updates the display on the image adjustment screen 230. For example, assuming that the image orientation information has been set to 90 degrees by the image orientation designation instruction, the number of 1920 horizontal pixels and the number of 1080 vertical pixels are interchanged such that the number of horizontal pixels is set to 1080 and the number of vertical pixels is set to 1920. As a consequence, the aspect ratio of the image data is changed, and therefore the direction used for the size ratio information is changed to the vertical direction. Therefore, assuming that the size of the sheet section of the ratio indicating image is 226 horizontal pixels×320 vertical pixels and the size ratio information is set to 0.6, the size of the image section of the ratio indicating image is changed to 108 horizontal pixels×192 vertical pixels. The CPU 101 causes a ratio indicating image to be generated using this image section size and updates the display on the image adjustment screen 230.

In the step S506, the CPU 101 determines whether or not an image position change instruction has been received from the console section 116. If it is determined that the image position change instruction has been received, the CPU 101 proceeds to a step S507, whereas if it is determined that the instruction has not been received, the CPU 101 proceeds to a step S508.

In the step S507, the CPU 101 temporarily stores the value of an image position change designated in the step S506, causes a ratio indicating image to be generated according to the value and updates the display on the image adjustment screen 230. For example, in a case where the position of center is set by the image position change instruction, the position of the image section on the sheet section is changed to the center of the sheet section. In doing this, the CPU 101 determines the position of the image section with reference to the upper left corner of the sheet section. Assuming that the size of the sheet section is 226 horizontal pixels×320 vertical pixels and the size of the image section is 108 horizontal pixels×192 vertical pixels, the numbers of pixels corresponding to a left-blank portion of the sheet section are calculated. The number of pixels corresponding to a horizontal size of the left-blank portion is determined as 226 pixels−108 pixels=118 pixels, and the number of pixels corresponding to a vertical size of the left-blank portion is determined as 320 pixels−192 pixels=128 pixels. From the above, a ratio indicating image is generated in which an image section is arranged such that it starts from 59 pixels horizontally rightward of the left end of the sheet section and 64 pixels vertically downward of the upper end of the same, and the display on the image adjustment screen 230 is updated.

In the step S508, the CPU 101 determines whether or not an image adjustment finalization instruction has been received from the console section 116 (i.e. the OK button has been pressed). If the image adjustment finalization instruction has been received, the CPU 101 proceeds to a step S509, whereas if the image adjustment finalization instruction has not been received, the CPU 101 returns to the step S502.

The CPU 101 finalizes the temporarily stored size ratio information, image orientation information, and image position information (step S509), followed by terminating the present process.

Although in the above-described process, the screen is updated whenever a change instruction is received in the step S502, S504, or S506, each instruction may be temporarily stored and then a ratio indicating image may be generated based on all the stored instructions, whereby the display on the image adjustment screen 230 may be updated.

Next, a detailed description will be given of the image forming method executed in the step S410.

The CPU 101 causes generation of an image to be printed on a sheet, based on the selected data item, the output sheet size information temporarily stored in the steps S407, and the size ratio information, image orientation information, and image position information temporarily stored in the step S409. More specifically, the size of the image to be printed on a sheet is calculated from the output sheet size information and the size ratio information. In order to display the selected data item in the calculated size of the image to be printed, enlargement processing or reduction processing is performed on the selected data item. The enlargement/reduction processing is image processing for generating an image for real-size preview, and it may be executed by the CPU 101 or alternatively by the scanner image processor 112 or the printer image processor 113. The processed image data is temporarily stored in the RAM 102, and an image for real-size preview is generated based on the stored image data. The generated image for real-size preview is sent from the RAM 102 to the console section 116 via the console section interface 106, and an area to be displayed on the console section 116 is selected, whereby display of a real-size preview is performed.

Assuming that the number of pixels of the image data is 1080 horizontal pixels×1920 vertical pixels, and there are temporarily stored the output sheet size information set to a horizontal length of 210 mm×a vertical length of 297 mm, which is the A4 size, the size ratio information set to 0.2, the image orientation information set to 0 degrees, and the image position information set to "upper left", the size of the image to be printed on a sheet is calculated by the following equations:

horizontal image length after designation of size ratio=210 mm (horizontal A4 length)×0.2=42 mm, and number of horizontal pixels of image after designation of size ratio=42 mm (horizontal image length)/(25.4 mm/inch)×600 [dpi] (printer section printing resolution)=992 pixels.

By reducing, according to the size ratio information of 0.2, an image of 992 horizontal pixels×1766 vertical pixels which is obtained by reducing the original image data by approximately 92% as understood from the above-mentioned values (992/1080), the size of the image is changed into a designated image size. Since an image for real-size preview defined by the display resolution is obtained by reducing an image of the A4 size set by the output sheet size information, which is defined by the printing resolution, by 12%, the A4 size is defined by 596 horizontal pixels×842 vertical pixels. Further, the number of pixels of image data of the image for real-size preview is calculated as follows:

number of horizontal pixels of image for real-size preview=992 pixels×0.12=119 pixels, and number of vertical pixels of image for real-size preview=1766 pixels×0.12=212 pixels.

The image for real-size preview generated here is displayed on the real-size preview screen.

According to the present embodiment, it is possible to execute real-size preview for image data that does not have output sheet size information or resolution information. Further, it is possible to select a size of an image to be printed, a position of the image, an orientation of the same, etc. while checking the ratio between the size of a sheet and that of the image, and then execute real-size preview. This makes it possible to easily estimate the size of the image to be printed. Thus, an image size can be checked before printing even for image data that does not have output sheet size information or resolution information, and therefore, it is possible to prevent occurrence of a printing error that characters or graphics are printed in an unintended size.

Further, since real-size preview is executed after an image size is estimated, it is possible to check an image for real-size preview having a desired image size, without repeatedly executing real-size preview while changing size settings, which contributes to improvement of user friendliness.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2011-266843 filed Dec. 6, 2011, which is hereby incorporated by reference herein in its entirety.

What is claimed is:

1. An image forming apparatus comprising:
a first storage unit configured to store a plurality of data items;
a printing unit configured to print a data item selected from the plurality of data items stored in said first storage unit;
a sheet size information determination unit configured to determine whether or not the selected data item has sheet size information;
a second storage unit configured to, when said sheet size information determination unit determines that the selected data item has sheet size information, store the sheet size information as a sheet size for printing of the selected data item, and configured to, when said sheet size information determination unit determines that the selected data item does not have sheet size information, cause a user to select a sheet size for printing of the selected data item and store the selected sheet size;
a generation unit configured to generate an image for real-size preview from the selected data item based on the sheet size stored by said second storage unit; and
a display unit configured to display the image for real-size preview generated by said generation unit.

2. The image forming apparatus according to claim 1, further comprising a resolution information determination unit configured to, when the selected data item is image data, determine whether or not the image data has resolution information, and
an adjustment unit configured to, when said resolution information determination unit determines that the image data does not have resolution information, adjust a resolution of the image data.

3. The image forming apparatus according to claim 2, wherein said adjustment unit finalize size ratio information indicative of a ratio between the selected sheet size and an image size of the image data, image orientation information indicative of an orientation of an image of the image data on a sheet, and image position information indicative of a position of the image of the image data on the sheet, and
wherein said generation unit calculates a size of an image to be printed by said printing unit, based on information on the selected sheet size, the size ratio information, the image orientation information, and the image position information, and generates the image for real-size preview.

4. The image forming apparatus according to claim 1, further comprising a screen displaying unit configured to display a screen for causing the user to select a sheet size for printing of the selected data item when said sheet size information determination unit determines that the selected data item does not have sheet size information,
wherein said second storage unit stores the sheet size selected by the user via the screen.

5. The image forming apparatus according to claim 1, wherein the image for real-size preview is substantially identical in size with an image of the selected data item printed on a sheet of the stored sheet size.

6. The image forming apparatus according to claim 1, wherein said first storage unit is configured to store document data and/or image data thereinto.

7. An image display method for an image forming apparatus including a first storage unit configured to store a plurality of data items and a printing unit configured to print a data item selected from the plurality of data items stored in the first storage unit, comprising:

determining whether or not the selected data item has sheet size information;

storing in a second storage unit, when it is determined that the selected data item has sheet size information, the sheet size information as a sheet size for printing of the selected data item;

causing, when it is determined by said determining that the selected data item does not have sheet size information, a user to select a sheet size for printing of the selected data item and store the selected sheet size in the second storage unit;

generating an image for real-size preview from the selected data item based on the stored sheet size; and displaying the generated image for real-size preview.

8. A non-transitory computer-readable storage medium storing a computer-readable program for causing a computer to execute an image display method for an image forming apparatus including a first storage unit configured to store a plurality of data items and a printing unit configured to print a data item selected from the plurality of data items stored in the first storage unit, and the computer, wherein the image display method comprises:

determining whether or not the selected data item has sheet size information;

storing in a second storage unit, when it is determined that the selected data item has sheet size information, the sheet size information as a sheet size for printing of the selected data item;

causing, when it is determined by said determining that the selected data item does not have sheet size information, a user to select a sheet size for printing of the selected data item and store the selected sheet size in the second storage unit;

generating an image for real-size preview from the selected data item based on the stored sheet size; and displaying the generated image for real-size preview.

\* \* \* \* \*